United States Patent [19]

Hufendiek et al.

[11] Patent Number: 5,477,817
[45] Date of Patent: Dec. 26, 1995

[54] CASING COVER WITH OIL COOLER FOR AN INTERNAL COMBUSTION ENGINE

[75] Inventors: Ernst-Wilhelm Hufendiek, Stuttgart; Walter Kerschbaum, Fellbach; Johannes Werner, Hamburg, all of Germany

[73] Assignee: Mercedes-Benz AG, Stuttgart, Germany

[21] Appl. No.: 372,789

[22] Filed: Jan. 13, 1995

[30] Foreign Application Priority Data

Jan. 14, 1994 [DE] Germany ............ 44 00 952.6

[51] Int. Cl.$^6$ ............................................ F01P 11/08
[52] U.S. Cl. ................. 123/41.33; 123/195 C; 123/196 AB
[58] Field of Search ............ 123/41.33, 196 A, 123/196 AB, 195 C

[56] References Cited

U.S. PATENT DOCUMENTS 2,898,896  8/1959  McKinney .................. 123/41.33

FOREIGN PATENT DOCUMENTS

| | | |
|---|---|---|
| 0933902 | 9/1955 | Germany . |
| 2459295 | 7/1975 | Germany . |
| 2737054 | 3/1979 | Germany . |
| 2951961 | 7/1980 | Germany . |
| 2909047 | 3/1981 | Germany . |
| 3332113 | 8/1983 | Germany . |
| 3701083 | 5/1988 | Germany . |
| 4029408 | 3/1992 | Germany . |

OTHER PUBLICATIONS

Die neuen Mercedes–Benz Nutz fahr zeugmotoren OM441, OM441LA, OM442, OM442LA, Printed Co. Publ. Sep. 1989.

*Primary Examiner*—Noah P. Kamen
*Attorney, Agent, or Firm*—Klaus J. Bach

[57] ABSTRACT

A casing cover for an internal combustion engine with an engine casing having two cylinder banks is mounted on one end of the engine casing and includes an oil cooler, an oil filter, an oil filter bypass arrangement and also a transverse cooling water passage in communication with main cooling water passages extending along the cylinder banks and a transverse oil passage in communication with main oil passages also extending along the cylinder banks, and comprises three adjacent but separate functional areas, a first lowermost area which includes the lubricating oil passages leading to and from the oil cooler, the oil filter and the main oil passages, a second functional area which includes a cooling water space receiving the oil cooler and is disposed above the first functional area and a third functional area which is disposed next to the second functional area and includes cooling water return passages receiving the cooling water from said cylinder banks.

20 Claims, 6 Drawing Sheets

CASING COVER WITH OIL COOLER FOR AN INTERNAL COMBUSTION ENGINE

BACKGROUND OF THE INVENTION

The invention relates to an oil-filter/oil-cooler combination in a casing cover of an internal combustion engine having two cylinder banks arranged in a V-shape.

The applicant's company publication "Die neuen Mercedes-Benz Nutzfahrzeugmotoren OM 442A, OM 442LA (The new Mercedes-Benz commercial-vehicle engines OM 442A, OM 442LA)" discloses an oil-filter/oil-cooler combination in a casing cover of an internal combustion engine having two cylinder banks arranged in a V-shape, an oil cooler, an oil filter, an oil-filter bypass arrangement and a section of a cooling-water circuit being integrated in the casing cover arranged laterally on the internal combustion engine. The two cylinder banks each contain main water passages extending longitudinally through the cylinder banks and main oil passages of a lubricating-oil circuit which is separate from the cooling-water circuit. The main water passages are interconnected by at least one transverse water passage extending across the front end of the internal combustion engine transversely to its longitudinal direction.

For general background information, reference is also made to the publications German Offenlegungsschrift 4029408, German Patent 3701083, German Offenlegungsschrift 2951961, German Offenlegungsschrift 2909047, German Patent 2737054 and German Auslegeschrift 2459295.

It is the object of the invention to provide an oil-filter/oil-cooler combination in a casing cover of an internal combustion engine such that various functions for the engine operation can be accommodated in a small space in this casing cover and, at the same time, in a simple and inexpensive manner.

SUMMARY OF THE INVENTION

A casing cover for an internal combustion engine with two cylinder banks mounted on one end of the engine includes an oil cooler, an oil filter, an oil filter bypass arrangement and also a transverse cooling water passage in communication with main cooling water passages extending along the cylinder banks and a transverse oil passage in communication with main oil passages also extending along the cylinder banks. The casing cover comprises three adjacent but separate functional areas: The first, lowermost area includes the lubricating oil passages leading to and from the oil cooler, the oil filter and the main oil passages. The second functional area includes a cooling water space receiving the oil cooler and is disposed above the first functional area. The third functional area, disposed next to the second functional area, includes cooling water return passages for receiving the cooling water from the cylinder banks.

An advantage of the oil-filter/oil-cooler combination according to the invention lies in the fact that important functions for the engine operation are integrated in a compact manner in the casing cover by an optimum spatial and space-saving distribution of the functional areas for oil cooling, oil filtering, oil-filter bypassing and cooling-water circulation and by the parallel arrangement of the transverse water passage of the cooling-water circuit and of the transverse oil passage of the lubricating-oil circuit in the casing cover.

A further advantage of the arrangement according to the invention is that the casing cover can be manufactured relatively simply and cost-effectively in an aluminum die-casting process.

Furthermore, since the oil-filter/oil-cooler combination according to the invention is incorporated in the casing cover, use of identical components (e.g., oil coolers, valves, oil filters) for various engine models reduces costs.

A further advantage of the casing cover according to the invention is that, in particular due to the arrangement of the transverse water passage in the casing cover, the basic configuration of the engine casing of the internal combustion engine is substantially simplified. The production costs for the engine casing are considerably less, and despite a casing cover of more complicated configuration compared with the prior art, costs are lower overall.

With the functional areas spatially arranged to be on top of one another, the oil-filter/oil-cooler combination and the casing cover require only a small space.

Preferably, part of the casing cover covers and seals the camshaft at the front end of the engine so that a special sealing plate is no longer required for this purpose which reduces production costs even more.

Appropriate venting openings and the spacial arrangement of the cooling water passages reliably vent the oil and water circuit during filling and during engine operation.

A non-return valve disposed in the oil passage in front of the oil cooler prevents the draining of the oil from the oil cooler via the oil pump back into the oil sump when the engine is shut down.

Communication openings between adjacent passages permit complete draining of the oil or the water from the oil circuit or cooling-water circuit when the oil or water is drained.

The lubricating oil reaches the lubricating points via shorter lubricating-oil paths due to the parallel oil supply to both main oil passages of the engine casing. The oil quantity and oil pressure of the lubricating oil are therfore controlled considerably better, especially at the lubricating points (e.g. bearings) furthest away from the feed-in point for the lubricating oil.

Since oil-pressure and oil-temperature transducers are arranged between the two main oil passages, the measurement of oil pressure and oil temperature at a central point situated relatively close to the lubricating points provides for highly accurate information for the engine control system.

The invention is explained in greater detail in the drawings with reference to two exemplary embodiments.

DESCRIPTION OF THE PREFERRED EMBODIMENT

Figure 1:
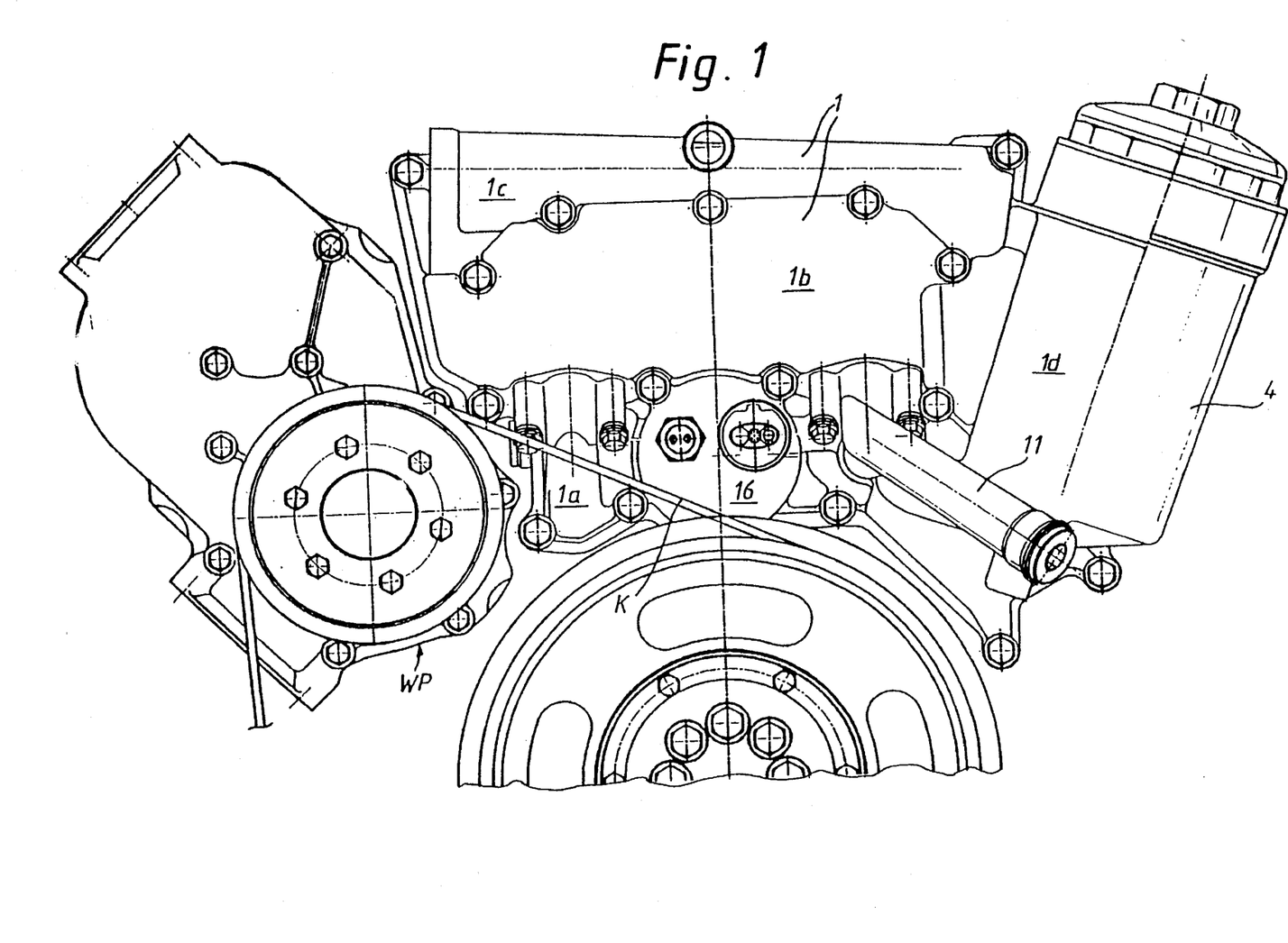
FIG. 1 shows a first exemplary embodiment in a front view of a casing cover according to the invention, comprising an oil-filter/oil-cooler combination for an internal combustion engine having two cylinder banks. The casing cover is flange-mounted on the front end of the internal combustion engine.
Figure 2:
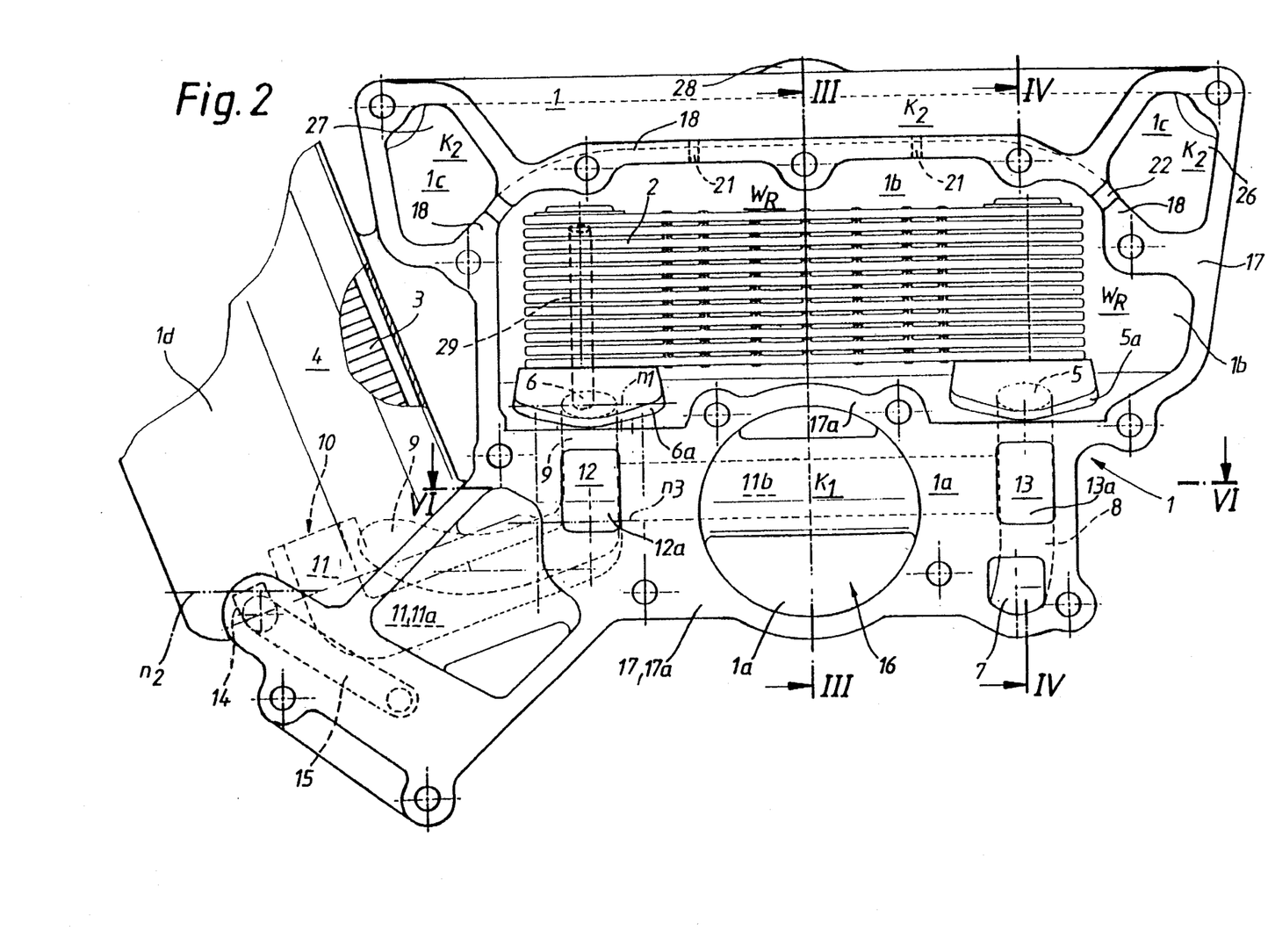
FIG. 2 is a side view of the casing cover facing the internal combustion engine.

FIGS. 1 and 2 show an oil-cooler/oil-filter combination in a casing cover 1 fastened to the front end of an internal combustion engine which contains two cylinder banks. FIG. 1 is an outside view of the casing cover 1 facing the internal combustion engine and shows the casing cover 1 accommodating an oil cooler 2 and an oil filter 3.

The internal combustion engine (not shown) has two separate liquid circuits, the first being a cooling-water circuit and the second being a lubricating-oil circuit.

The casing cover 1 is of one-piece design made as an aluminum die casting. It comprises four adjacently arranged functional areas 1a–1d separate from one another. The lowermost functional area 1a in the installed position of the casing cover 1 serves to remove oil from the engine casing and to feed oil to the main oil lines $H_1$, $H_2$ (see FIG. 6) of the internal combustion engine. This area also includes an oil-pressure transducer D, an oil-temperature transducer T and a non-return valve RV, the non-return valve RV being alternatively arranged in the oil passage 8. The second functional area 1b, lying above the functional area 1a, contains a water space $W_R$ which is part of a cooling-water circulating system for the engine casing. An oil cooler 2 is arranged in the water space $W_R$, where it is surrounded by cooling water on all sides. The functional area 1c is located in the uppermost part of the casing cover 1 and contains a transverse water passage $K_2$ which is part of a cooling-water return from the cylinder banks. The functional area 1d contains an oil-filter casing 4 which, in the installed position of the casing cover 1 and as viewed in horizontal direction from the engine center towards a first cylinder bank of the two cylinder banks of the internal combustion engine, is integrally cast at the side of, and at the same height as, the three functional areas 1a–1c of the casing cover. The oil filter (filter cartridge) is located in the oil-filter casing 4.

The casing cover 1 is centrally attached to the engine casing on the front end of the latter horizontally next to a water pump WP arranged on the second cylinder bank. It is arranged as high as, or higher than, the water pump WP, but is separate from the water pump. As apparent from FIG. 2, the three functional areas 1a–1c are arranged one above the other such that they are all cut by a plane extending normal to the longitudinal axis of the engine. For optimum space utilization, the bottom functional area 1a of the casing cover 1 is arranged behind a V-belt drive K for the water pump WP.

The oil cooler 2 has an inlet opening 5 together with a flange 5a and an outlet opening 6 together with a flange 6a for the lubricating oil and is screwed at the flanges 5a (FIG. 4) and 6a (FIG. 2) to the casing cover 1.

Figure 6:
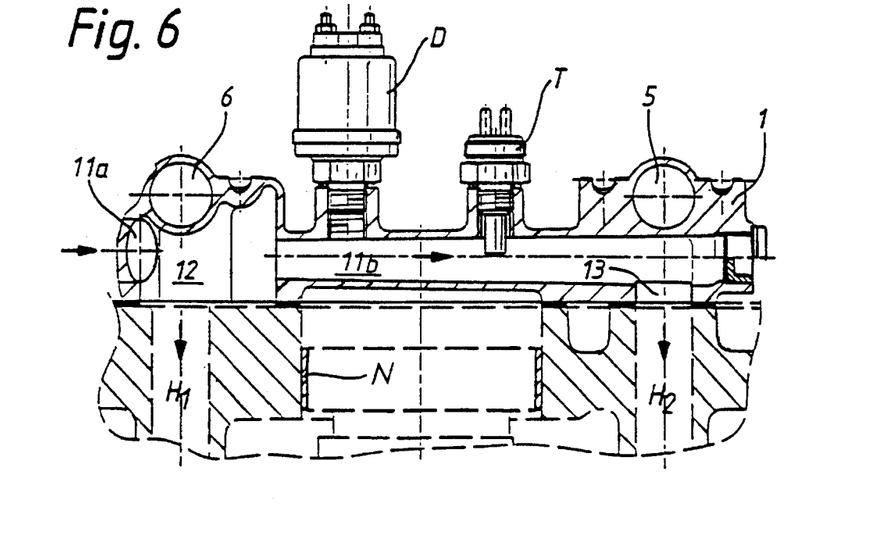
FIG. 6 is a sectional view along line VI—VI of FIG. 2.
Figure 7:
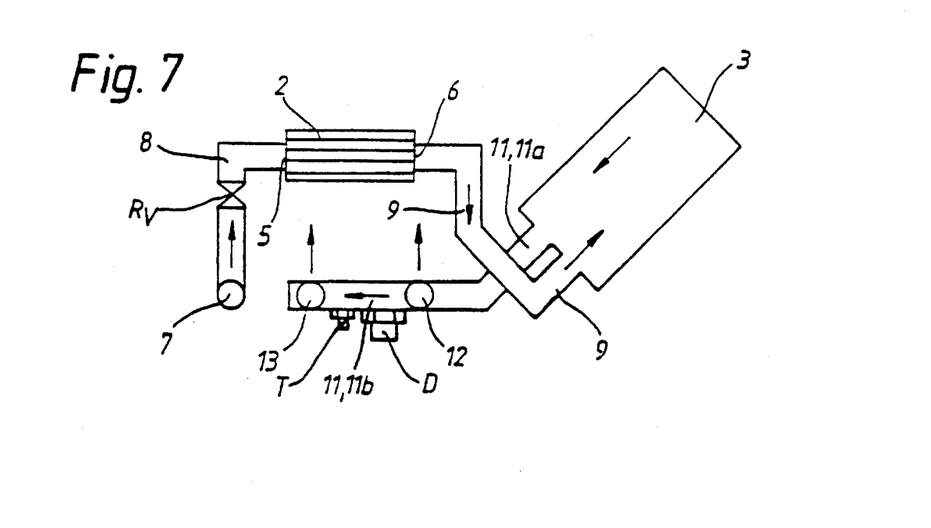
FIG. 7 schematically represents the oil flow through the casing cover according to the invention together with oil cooler, oil filter, non-return valve and measuring transducers for oil pressure and oil temperature.

As indicated in FIG. 7, the lubricating oil flows from an inlet opening 7 of the casing cover 1 via a non-return valve RV and an oil passage 8 to the inlet opening 5 of the oil cooler 2. Then the oil flows through the latter to the outlet opening 6 and from there, via an oil passage 9, into the oil-filter casing 4 and the oil filter 3. When leaving, the oil filter 3, the lubricating oil flows via an opening 10 into an oil passage 11 (FIG. 2) having an oil-passage part 11a and a transverse oil passage $K_1$ extending to main oil passages $H_1$, $H_2$ (see FIG. 6) of the internal combustion engine. The two main oil passages $H_1$, $H_2$ extending along the cylinder banks of the internal combustion engine are in communication with Y-shaped secondary passages (not shown) leading to secondary consumers (not shown) such as crankshaft bearings, camshaft bearings, cylinder heads and piston sprayers.

The oil passage 9 and the transverse oil passage $K_1$ are in communication with each other via a bypass valve (not shown) for bypassing of the oil filter, for example, when the lubricating oil is still very viscous during the cold starting phase at low external temperatures.

The oil-passage part 11a of the oil passage 11 leads from the oil-filter casing 4 back to the casing cover 1 and then to the transverse oil passage $K_1$. The transverse oil passage arranged in the casing cover 1 extends across a camshaft bore. Two relatively short longitudinal passages 12 and 13 are located in the transverse oil passage $K_1$ at the same spacing as the two main oil passages $H_1$, $H_2$ of the internal combustion engine. A passage opening 12a of the longitudinal passage 12 communicates with the main oil passage $H_1$ of the first cylinder bank, and a passage opening 13a of the longitudinal passage 13 communicates with the main oil passage $H_2$ of the second cylinder bank.

In the installed state, the oil filter 3 in the oil-filter casing 4 closes an oil-discharge valve 14 which is arranged in the bottom area of the latter. The oil-discharge valve 14 controls an oil-discharge passage 15 for emptying oil through the engine casing into an oil sump (not shown) of the internal combustion engine and is opened automatically when the filter cartridge is removed.

The oil cooler 2 is arranged on the casing cover 1 such that, in the installed position, a level $n_1$ of the outlet opening 6 lies above a level $n_2$ of an oil-discharge valve 14 in the oil-filter casing 4.

Since the engine oil is generally changed when the oil filter 3 is changed, the lubricating oil located in the oil cooler 2 can be completely drained via the oil-discharge valve 14 in the oil-filter casing 4 into an oil sump (not shown) of the internal combustion engine. As apparent from FIG. 2, the level $n_1$ also lies below a level $n_3$ of the transverse oil passage $K_1$ so that the latter can also be emptied via the oil-discharge valve 14.

On the other hand, in the state in which the internal combustion engine is ready for operation (screwed-in oil filter 3), the non-return valve RV arranged in the oil passage 8 in the oil flow direction in front of the oil cooler 2 prevents the oil contained in the oil cooler 2 from flowing back through the oil pump into the oil sump when the engine is shut down.

The transverse water passage $K_2$ and the transverse oil passage $K_1$ are cast into the casing cover 1. The cross-section of the oil passage 11 together with oil-passage part 11a and transverse oil passage $K_1$ and the two longitudinal passages 12 and 13 is greater than the cross-section of the main oil passages $H_1$, $H_2$ in the engine casing of the internal combustion engine. When the casing cover 1 is flange-mounted, the passage opening 12a of the longitudinal passage 12 covers the end opening of the main oil passage $H_1$ of the first cylinder bank, and the passage opening 13a of the longitudinal passage 13 covers the end opening of the main oil passage $H_2$ of the second cylinder bank.

The casing cover 1 is sealed off towards the engine casing at a casing-cover sealing surface 17 by a one-piece, continuous gasket (not shown).

The functional area 1a of the casing cover 1 is arranged at the same height as the frontmost camshaft bearing N (see FIG. 6) of a camshaft of the internal combustion engine and directly in front of the latter. The functional area has, in the area of the camshaft, a rib-strengthened widened portion 16 with an annular sealing surface 17a, facing the front end of the engine casing for sealing off the frontmost camshaft bearing. Here, part of the casing cover 1 is arranged behind a vibration damper attached to the crankshaft of the internal combustion engine.

Communication openings 21, interconnecting the two functional areas 1b and 1c, extend through an intermediate wall 18 arranged between the water space $W_R$ of the cooling-water feed and the transverse water passage $K_2$ of the cooling-water return. The openings 21 are vapor holes (diameter about 3–4 mm) through which vapor collected in the top area of the water space $W_R$ can escape into the transverse water passage $K_2$. Furthermore, the water space $W_R$ communicates with the transverse water passage $K_2$ via relatively small communication passages 22 so that cooling water can flow out of the water space $W_R$ via the communication passages 22 into the transverse water passage $K_2$ and vice versa.

In one embodiment of the invention, the openings 22 are formed by a cut-out in the casing-cover sealing surface 17 (together with a cut-out in the gasket belonging to the latter).

The transverse water passage $K_2$ is arranged at the highest point of the internal combustion engine and has an opening 28 for connecting a vent line arranged in the center of the casing cover 1. It can also be attached to a filler neck just below a filler cap (not shown).

The openings 26, 27, leading to the transverse water passage $K_2$ for communication with the main water passage to the engine casing are located lower than the transverse water passage $K_2$ itself.

To vent the elevated oil cooler 2, to which oil flows from below, a small-diameter upright steel pipe 29 (shown by broken lines) open at the bottom and the top is located in the oil cooler with its bottom opening disposed in the outlet opening 6 of the oil cooler 2.

Figure 3:
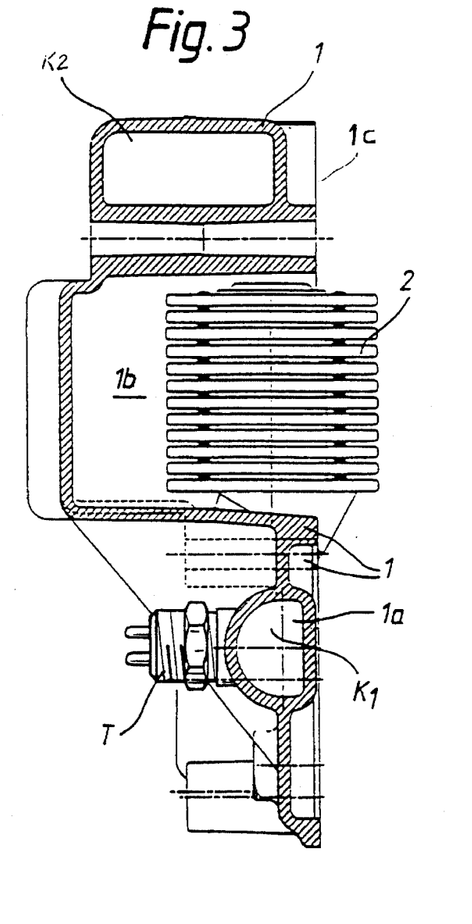
FIG. 3 is a sectional view along line III—III of FIG. 2.
Figure 4:
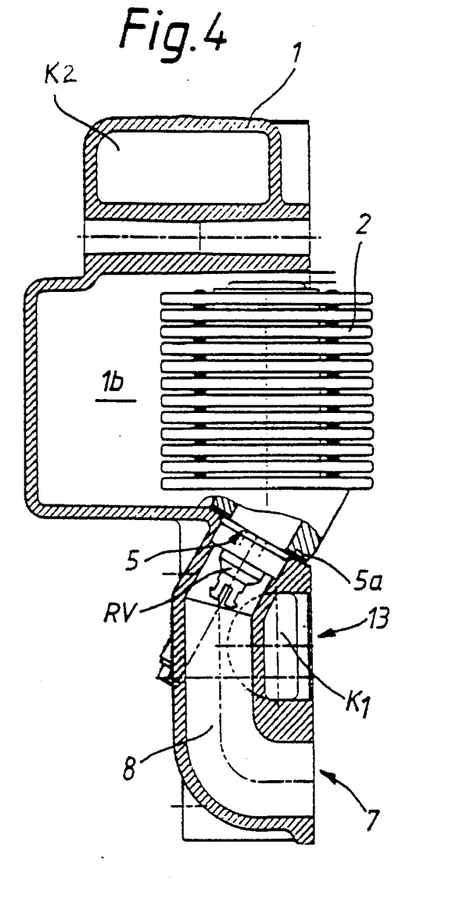
FIG. 4 is a sectional view along line IV—IV of FIG. 2 showing an oil passage leading to the oil cooler wherein a non-return valve is arranged.

A section III—III of FIG. 2 is shown in FIG. 3 and a section IV—IV of FIG. 2 is shown in FIG. 4. The same components are indicated by the same reference numerals.

Figure 5:
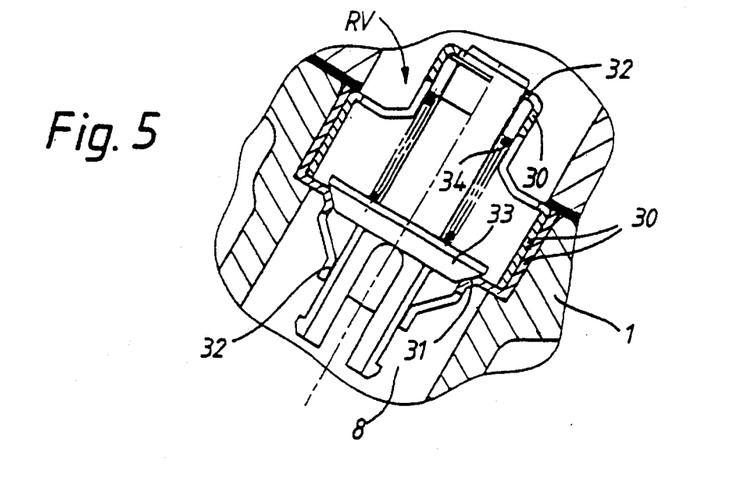
FIG. 5 is a longitudinal sectional view taken in a plane extending through the non-return valve located in the oil passage.

FIG. 5 shows a longitudinal section through the non-return valve RV arranged in the oil passage 8. The non-return valve RV may or may not be used. The non-return valve RV is designed as an independent component and can be pressed into a widened portion 8a of the oil passage 8. The non-return valve RV consists of a one-piece or multi-piece sheet-metal cage 30, which forms a valve seat 31 and valve guides 32, and of a valve cone 33 and a valve spring 34.

In another type of valve design the tapered valve seat 31 can also be formed directly with a corresponding configuration of the oil passage 8, while an inserted sheet-metal cage accommodates the valve spring and, at the same time, constitutes the valve end stop.

In FIG. 6 is a view taken along section VI—VI of FIG. 2 showing the transverse oil passage $K_1$ together with temperature transducer T and pressure transducer D. As shown the longitudinal passages 12 and 13 lead from the transverse oil passage $K_1$ into the main oil passages $H_1$ and $H_2$ of the internal combustion engine. The camshaft bearing N is located between the two main oil passages $H_1$, $H_2$. Otherwise the same reference numerals are used for the same components as in FIGS. 1 and 5.

FIG. 7 is a schematic representation of the oil flow arrangement, already described above, through the oil cooler 2, the oil filter 3 and the casing cover 1. The oil flow and thus, the sequence of the components of the oil-filter/oil-cooler combination according to the invention through which the oil flows, is shown by arrows. The same components are identified by the same reference numerals.

Figure 8:
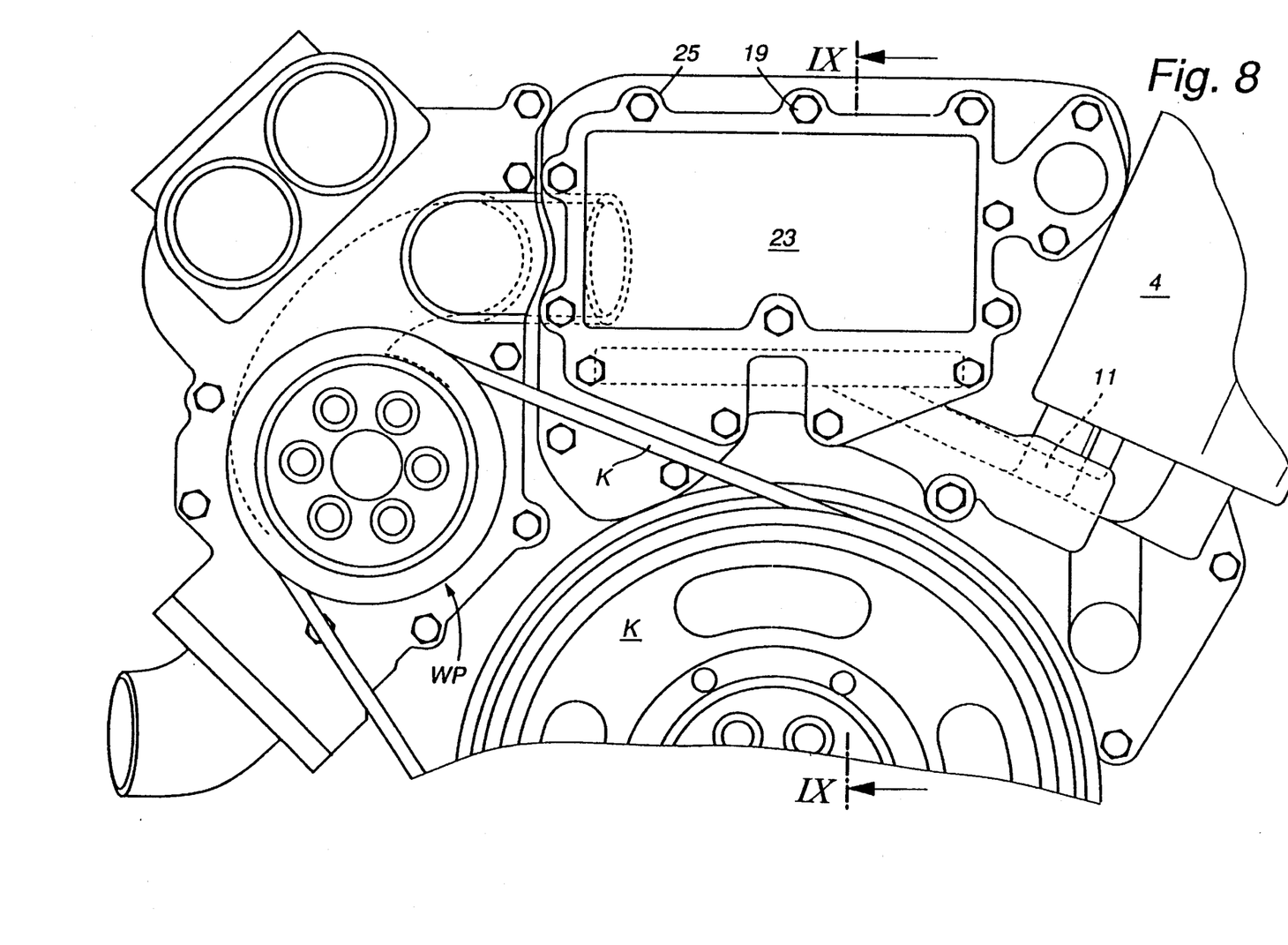
FIG. 8 shows a second exemplary embodiment in a front view of a split casing cover according to the invention with two flanged-together casing-cover parts, wherein the oil cooler is fastened to the outer casing-cover part, and the inner casing-cover part is flange-mounted on the internal combustion engine and contains a transverse oil passage.
Figure 9:
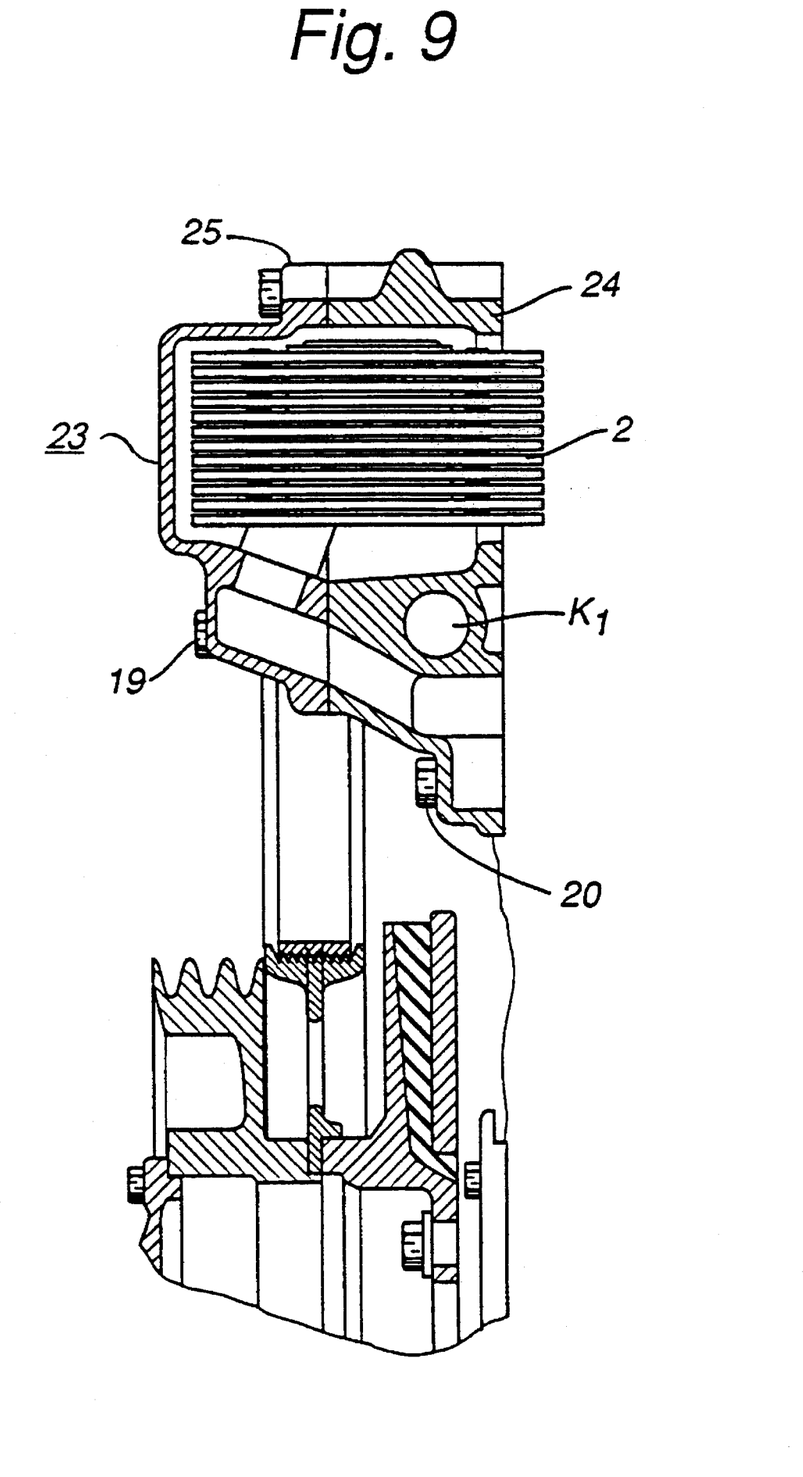
FIG. 9 is a sectional view taken along line IX—IX of FIG. 8 in a plane extending through the split casing cover.

In a second exemplary embodiment as shown in FIGS. 8 and 9, a casing cover 23 is provided on the front end of an internal combustion engine which is split to facilitate access to the oil cooler. FIG. 8 is a front view and FIG. 9 is a sectional view taken along line IX—IX of FIG. 8 showing the front end of the internal combustion engine together with casing cover 23. The same components of FIGS. 1 to 7 are identified by the same reference numerals.

The casing cover 23 consists of two casing-cover parts 24 and 25 detachably flanged together in a sealing manner by screws 19, the casing-cover part 24 being flange-mounted on the engine casing of the internal combustion engine by screws 20.

The oil cooler 2 is fastened in the casing-cover part 25 in a similar manner as shown in FIG. 2. In this exemplary embodiment, the transverse oil passage $K_1$ is located in the casing-cover part 24. The transverse water passage $K_2$ is integrated in the engine casing of the internal combustion engine. In this exemplary embodiment, a sealing plate, as known from the prior art, seals the camshaft.

In a further embodiment of the invention, the one-piece casing cover has a fifth functional area containing a fuel-filter casing, arranged at the side of the oil-filter casing, together with the fuel filter.

What is claimed is:

1. A casing cover for an internal combustion engine having an engine casing with two cylinder banks and a cooling circuit with two main cooling water passages extending longitudinally alongside said cylinder banks, a lubricating oil circuit with two main lubricating oil passages also extending alongside said cylinder banks, said cover being mounted on one end of said engine and including a lubricating oil cooler, an oil filter and an oil filter bypass arrangement, a transverse cooling water passage extending through said cover transversely to said engine and having two openings providing for communication with said main cooling water passages for supplying cooling water thereto, and a transverse lubricating oil passage in communication with said main lubricating oil passages for supplying lubricating oil from said lubricating oil cooler and said oil filter to said main lubricating oil passages, said casing cover comprising three adjacent but separate functional areas, a first lowermost functional area including lubricating oil passages for removing engine oil from the engine casing and for supplying lubricating oil via said transverse lubricating oil passage to said main lubricating oil passages and, for bypassing the oil filter associated with said casing cover, a second functional area including a cooling water space receiving said lubricating oil cooler and being disposed above said first functional area, and a third functional area arranged adjacent said second functional area and including cooling water return passages for the return of cooling water from said cylinder banks.

2. A casing cover according to claim 1, wherein said third functional area is arranged above said second functional area.

3. A casing cover according to claim 1, wherein said casing cover contains a fourth functional area adjacent to, and at the same height as, said three other functional areas, said fourth functional area including said oil filter together with an oil-filter casing.

4. A casing cover according to claim 1, wherein said casing cover is centrally attached to the engine casing at a location horizontally next to, but separate from, a water pump mounted on one of said cylinder banks.

5. A casing cover according to claim 4, wherein said lowermost functional area is arranged at least partly behind a V-belt drive for said water pump.

6. A casing cover according to claim 1, wherein a sectional plane normal to the longitudinal direction of said engine extends through said three functional areas.

7. A casing cover according to claim 1, wherein said lowermost functional area of said casing cover is arranged at the same height as, and directly in front of, a frontmost camshaft bearing of said internal combustion engine.

8. A casing cover according to claim 1, wherein said engine casing has a cam shaft bearing and said casing cover has, in the area of said camshaft bearing, a rib-strengthened widened portion with an annular sealing surface, facing the front end of said engine casing, for sealing off said camshaft bearing.

9. A casing cover according to claim 1, wherein connecting openings for liquid and vapor exchange are arranged in an intermediate wall dividing said second and third functional areas.

10. A casing cover according to claim 1, wherein said transverse water passage is arranged at the highest point of the internal combustion engine and has an opening at the top for connecting a vent line.

11. A casing cover according to claim 1, wherein said transverse water passage has connecting openings for connection to said main water passages, said connecting openings being arranged lower than said transverse water passage.

12. A casing cover according to claim 1, wherein said oil cooler has an outlet opening and an upright pipe open at the top and bottom is arranged in said outlet opening of said oil cooler for venting said oil cooler.

13. A casing cover according to claim 1, wherein a non-return valve is arranged in an oil communication passage leading to said oil cooler.

14. A casing cover according to claim 13, wherein said non-return valve comprises a valve cone, a valve spring and a sheet-metal cage which contains a valve seat and valve guides such that said non-return valve can be pressed as a unit into said oil communication passage.

15. A casing cover according to claim 1, wherein communication passages are arranged in a wall dividing said two openings leading to said transverse water passages and said water space receiving said oil cooler.

16. A casing cover according to claim 15, wherein said casing cover has a sealing surface with said engine casing and said communicaton passages consist of cutouts in said casing cover sealing surface of said wall dividing said openings and said cooling water space.

17. A casing cover according to claim 16, wherein the spaces in said casing cover which are open toward said engine casing are, in an inward direction from the casing-cover sealing surface, shaped such that the spaces are well accessible and open so as to facilitate forming of the spaces in a die-casting process.

18. A casing cover according to claim 1, wherein said oil filter is mounted on a base formed on said casing cover at a level lower than said oil cooler and an oil discharge passage extends from said oil filter base to said engine casing and means are provided for blocking said discharge passage such that it is closed when said oil filter is mounted on said oil filter base but is open when said oil filter is removed so as to permit complete draining of the oil into said engine casing.

19. A casing cover according to claim 1, wherein said transverse oil passage formed in said casing cover has, at its opposite ends, oil passage openings in alignment with said two main lubricating oil passages of said cylinder banks, said casing cover covering the end openings of said main oil passages in said cylinder banks so as to seal said main lubricating oil passages and place them in communication with said tranverse oil passage.

20. A casing cover according to claim 19, wherein an oil-pressure transducer and an oil-temperature transducer are arranged in said transverse oil passage at an accessible location such that they can be mounted from outside and from the front of the engine.

* * * * *